3,244,203
SAW SHAFT ASSEMBLY
Clyde O. Leydig, P.O. Box 276, Exeter, Calif., and Yigal Michelson, Pardess, Hannan, Israel
Original application Feb. 25, 1963, Ser. No. 260,477, now Patent No. 3,192,695. Divided and this application Apr. 15, 1965, Ser. No. 448,294
6 Claims. (Cl. 143—155)

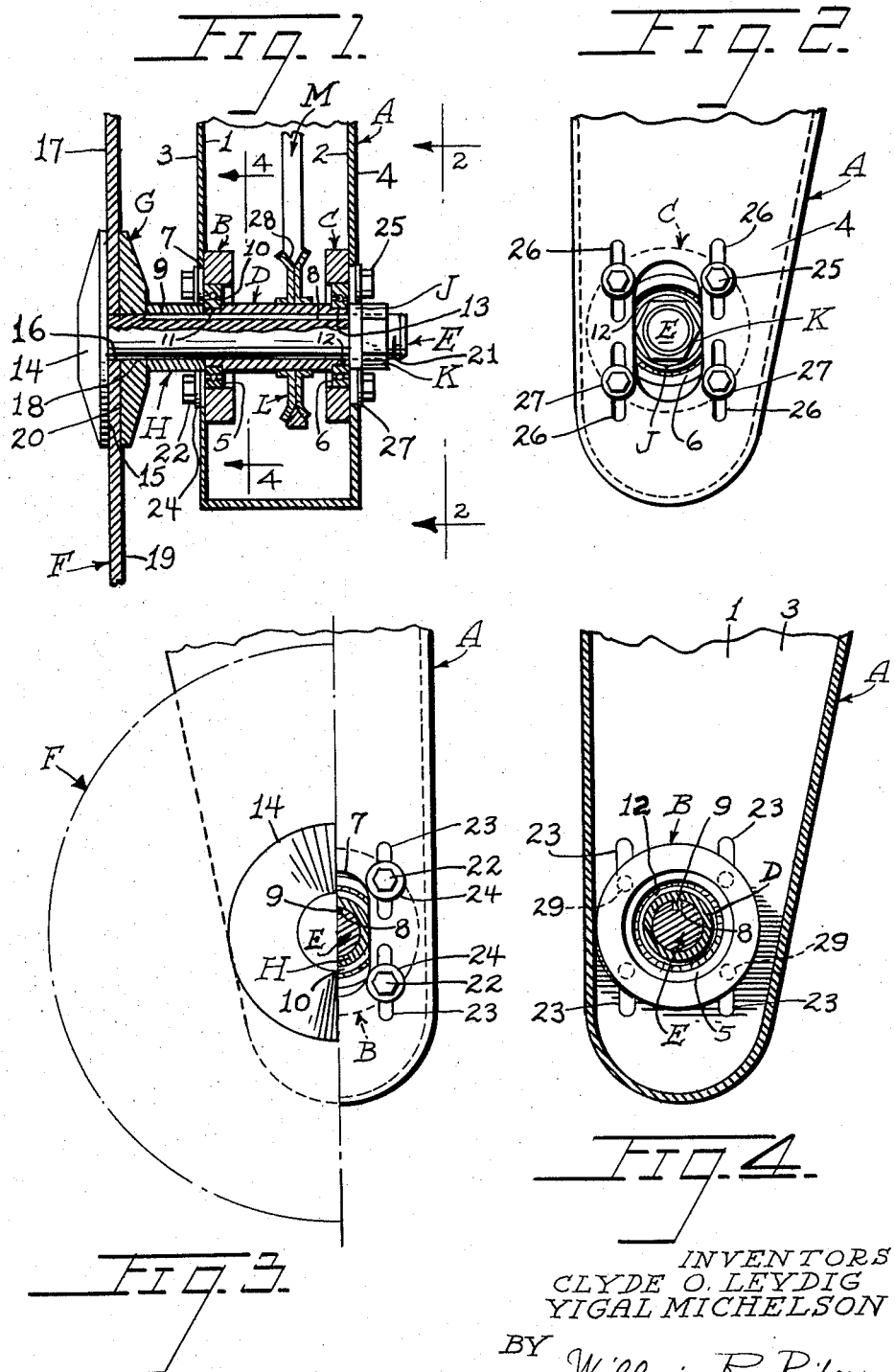

The present invention is a division of our copending application on a Tree Trimming Machine, Serial No. 260,477, filed February 25, 1963, now Patent No. 3,192,695. In the copending case we refer to a shaft assembly for each disc saw. The saw shaft assembly includes a shaft that is keyed to a main sleeve that is rotatably supported in bearings adjustably carried by the boom. A nut is screwed onto the threaded end of the shaft and secures the shaft to the main sleeve while at the same time forcing the sleeve into an abutting engagement with a spacing sleeve for moving the latter against a washer on the shaft and forcing this washer into frictional engagement with the adjacent surface of the disc saw, mounted on the shaft. The shaft has an integral head disposed opposite to the threaded shaft end and the head frictionally contacts with the opposite surface of the disc saw. The disc saw is placed near one side of the boom while the nut on the shaft is placed near the opposite side. The nut when tightened will not interfere with the free rotation of the main sleeve. An unscrewing of the nut will permit the saw assembly to be removed from the main sleeve as a unit. The nut will have no tendency to become accidently loosened when the disc saw takes shock loads either forward or reverse. Moreover the nut is disposed on the opposite side of the boom from the saw and therefore will not be contacted by the material being cut from the tree or other object.

The nut can be tightened to an extent for applying the desired frictional gripping action on the disc saw for connecting it to the rotating shaft. The tightening of the nut will have no effect on the frictionless bearing for supporting the saw shaft.

The saw shaft assembly is simple in construction and is durable and efficient for the purpose intended.

Other objects and advantages will appear as the specification continues. The novel features of the invention will be set forth in the appended claims.

*Drawing*

For a better understanding of our invention, reference should be made to the accompanying drawing, forming part of this specification, in which:

FIGURE 1 is a longitudinal section through the device, portions being shown in elevation.

FIGURE 2 is a rear elevation when looking in the direction of the arrows 2—2 in FIGURE 1.

FIGURE 3 is a front elevation of FIGURE 1 with only one-half of the disc saw being illustrated.

FIGURE 4 is a transverse section taken along the line 4—4 of FIGURE 1.

While we have shown only the preferred form of our invention, it should be understood that various changes, or modifications may be made within the scope of the annexed claims without departing from the spirit thereof.

*Detailed description*

In carrying out our invention, we show the device mounted at one end of a boom indicated generally at A, this boom being shown in our copending application, Serial No. 260,477, on a Tree Trimming Machine. We do not wish to be confined to mounting the device in a boom because the bearing and associate parts can be mounted in any device desired.

Bearing housings B and C are secured to the inner surfaces 1 and 2 of opposed walls 3 and 4 of the casing A that lie parallel with one another. A main sleeve D is rotatably mounted in ball bearings 5 and 6 which in turn are carried by the bearing housings B and C, respectively. The length of the main sleeve D is shown as being equal to the distance between the front and rear walls 3 and 4 although we do not wish to be confined to any particular length.

The front wall 3 has an opening 7 therein, see FIGURE 3, through which a shaft E projects. The opening 7 is elongated and is made wide enough for the main sleeve D to project therethrough if desired. The shaft E has a longitudinally extending groove 8 therein that will receive a longitudinally extending key 9 that is carried by the main sleeve D and by a spacing sleeve H, mounted on the shaft E. The inner race 10 of the ball bearing 5 is shown received in an annular recess 11 provided at one end of the main sleeve D.

In like manner the ball bearing 6 has its inner race 12 received in an annular recess 13 provided at the opposite end of the main sleeve D. The construction is such that the two ball bearings 5 and 6 will not only rotatably support the main sleeve D but they will also prevent longitudinal movement of the sleeve with respect to the bearing housings B and C and with respect to the front and rear walls 3 and 4 of the casing A.

The shaft E is extended forwardly beyond the front wall 3 of the casing A and is provided with a head 14, see FIGURES 1 and 3. The head 14 has a flat inner surface 15 and a disc saw F has a central opening 16 for receiving the shaft E and the outer face 17 of the saw is brought into contact with the flat inner surface 15 of the head 14. A washer G substantially of the same size as the head 14 has a central opening 18 for receiving the shaft E and the washer is moved against the rear face 19 of the disc saw F so that the front face 20 of the washer G will contact with the rear face of the disc saw. The spacing sleeve H, mentioned earlier, is mounted on the shaft E and is disposed between the front end of the main sleeve D and the rear end of the washer G.

If a beater, not shown, is to be associated with the disc saw, it can be mounted on the spacing sleeve H and then this sleeve would be keyed to the shaft E so as to be rotated by the shaft. The frictional pressure of the washer G upon the disc saw F is sufficient to cause the saw to rotate as a unit with the shaft E. However, if the disc saw F should strike an obstruction which would either slow its speed or temporarily stop it, the washer G would permit a relative rotation between the shaft and the saw before the pressure on the saw teeth would be sufficient to damage them.

We accomplish the adjustment of the pressure of the washer G upon the disc saw F in the following manner. In FIGURE 1, we show a rear washer J mounted on the shaft E and bearing against the rear end of the main sleeve D. A nut K is mounted upon the threaded end 21 of the shaft E. This nut may be tightened for moving the shaft E longitudinally with respect to the main sleeve D and the spacing sleeve H for causing these sleeves to exert the desired pressure against the washer G so that it will contact with the disc saw F with the desired pressure for rotating the saw with the shaft. At the same time the pressure is not so great as to prevent the disc saw from slowing down or stopping should the saw engage with an obstruction that is sufficient to injure the teeth on the saw or the saw itself if the saw continued rotating.

We provide novel means for adjusting the main sleeve D in a transverse direction. The mechanism for accomplishing this is shown in FIGURES 1, 2 and 3. The bearing housings B and C are secured to the front and rear walls 3 and 4 by cap screws. The bearing housing B has cap screws 22, see FIGURES 1 and 3, that have their shanks slidably received in slots 23 in the front wall 3. The threaded shanks of the cap screws are received in threaded bores 29 in the bearing housing B, see FIGURE 4, and the cap screws may be tightened after the bearing housing B has been moved transversely along the inner surface 1 of the front wall 3, into the desired position. The tightening of the cap screws clamps the bearing housing to the inner surface 1 of the front wall 3. Both FIGURES 1 and 3 show the heads of the cap screws bearing against washers 24 and these washers in turn contact with the outer surface of the front wall 3.

In like manner the bearing housing C shown in FIGURES 1 and 2 is adjustably held in place in the casing A by cap screws 25 that are similar to the cap screws 22. The shanks of the cap screws 25 are slidably received in slots 26 provided in the rear wall 4 of the casing A. The slots 26 extend in the same direction as the slots 23 so as to permit the bearing housing C to be moved simultaneously with the bearing housing B when it is desired to adjust the shaft E transversely in the casing A. The threaded shanks of the cap screws 25 are received in threaded bores in the bearing housing C. Washers 27 are mounted on the shanks of the cap screws 25 and contact with the outer surface of the rear wall 4. A tightening of the cap screws 25 will secure the bearing housing C in adjusted position with respect to the rear wall 4.

The purpose of the adjustment for the bearing housings B and C is to move a pulley L that is keyed to the main sleeve D, this pulley being moved transversely so as to take up any slack in a drive belt M. We show the pulley L in FIGURE 1 as having a V-shaped groove 28 for receiving the V-shaped belt M. We do not wish to be confined to any particular type of drive mechanism for the main sleeve D.

One of the principal advantages of the structure just described is that it permits the shaft E to be removed from the main sleeve D by merely removing the nut K from the threaded portion 21 on the shaft. The shaft may be longitudinally moved with respect to the main sleeve D after which the spacing sleeve H and the washer G may be removed from the shaft in order to gain access to the disc saw F. The saw F may be removed from the shaft and a new one substituted or the teeth on the periphery of the disc saw F can be sharpened and then the saw placed back on the shaft E. It is not necessary to remove any of the bearing housings B and C from the casing A when it is desired to detach the disc saw F from the shaft E.

We have already mentioned how the structure permits the shaft E to continue to rotate shoud the disc saw F strike an obstruction which might slow down the saw in its rotation or stop it completely from rotating. Any desired amount of friction can be built up between the head 14 of the shaft E and the washer G and this is accomplished by merely tightening the nut K. When the nut is tightened it will bear against the rear washer J and will tend to move the shaft E to the right in FIGURE 1 with respect to the main sleeve D because the washer J bears against the right hand end of the sleeve. The main sleeve D contacts with the spacing sleeve H and therefore there will be a straight line connection from the nut K to the rear face 19 of the disc saw F through the medium of the rear washer J, the main sleeve D, the spacing sleeve H and the washer G that contacts with the rear face 19. A tightening of the nut K will force the washer G into frictional contact with the disc saw F and the saw will be clamped between the washer G and the head 14.

It will also be seen from the structure described, that there will be no tendency for the nut K to rotate on the threads 21 when the shaft E and the main sleeve D are rotated. The reason for this is that the rotation of the shaft E is accomplished through the main sleeve D that is keyed to the shaft. The main sleeve D is rotated by the pulley L or other rotating means and the rear washer J with the nut K will rotate as a unit with the main sleeve D and the shaft E. There will therefore be no tendency for the nut K to be rotated with respect to the threaded portion 21.

We claim:
1. In combination:
 (a) a pair of spaced apart supporting bearings;
 (b) a sleeve rotatably carried by said bearings and having a length equal to the distance between said bearings;
 (c) a shaft removably mounted in said sleeve and being keyed thereto;
 (d) said shaft having an integral head at one end and its other end being threaded;
 (e) a disc saw mounted on said shaft and contacting with said shaft head;
 (f) a washer mounted on said shaft and contacting said saw from the side opposite to said shaft head;
 (g) a spacing sleeve mounted on said shaft and bearing against said washer and against the adjacent end of said first-mentioned sleeve; and
 (h) a washer and nut mounted on the threaded end of said shaft, the nut adapted to be tightened for forcing said last-named washer against the adjacent end of said first-named sleeve and for pulling on said shaft for moving said shaft head against said saw and the saw against said first-named washer and said first-named washer against said spacing sleeve for moving the latter against said first-named sleeve for securing these parts rigidly together as a unit, without in any way affecting the free rotation of said first-named sleeve in its bearings.

2. The combination as set forth in claim 1: and in which
 (a) a pair of parallel supporting walls are arranged on the outer sides of the spaced apart bearings; and
 (b) adjustable means for securing said bearings to said walls for rotatably supporting said shaft in the desired position with respect to said walls.

3. In combination:
 (a) a shaft having a head at one end and being threaded at its opposite end, said head having a flat undersurface that is normal to the axis of said shaft;
 (b) a rotatable member mounted on said shaft and having one side frictionally contacted by said flat undersurface of said head;
 (c) a first washer mounted on said shaft and having a flat surface adapted to frictionally contact with the other side of said member;
 (d) a driving sleeve and an abutting spacing sleeve mounted on said shaft and keyed thereto, one end of said spacing sleeve bearing against said first washer for urging the flat surface thereof into frictional contact with said rotatable member, the opposite end of said driving sleeve exposing the threaded end of said shaft;
 (e) a second washer mounted on said shaft and contacting with the adjacent end of said driving sleeve; and
 (f) a nut threaded onto the threaded end of said shaft and bearing against said second washer for moving said drive and spacing sleeves for forcing said first washer against one side of said rotatable member for frictionally engaging with said member and for moving said shaft and shaft head in the opposite direction for causing said head to frictionally engage with the opposite side of said member for causing said member to rotate with said shaft, said rotatable member being adapted to slow down or to stop rotating when the force tending to slow down or stop the rotation of said member is greater than the frictional force exerted on said member by said head and first washer for rotating the member with said shaft and sleeves.

4. The combination as set forth in claim 3: and in which
   (a) a driving member is mounted on said sleeve for rotating it and said shaft.

5. The combination as set forth in claim 3: and in which
   (a) a pair of spaced apart bearings are mounted on said sleeve for rotatably supporting it;
   (b) a housing for each bearing;
   (c) a casing for supporting said bearing housings; and
   (d) adjustable means for connecting said housings to said casing and permitting adjustment of said housings on said casing so that said shaft and sleeve may be moved laterally.

6. In combination:
   (a) a shaft having an integral head at one end and its other end being threaded;
   (b) a rotatable member mounted on said shaft and being frictionally contacted on one side by said head;
   (c) a first washer mounted on said shaft and contacting said member from the side opposite said shaft head;
   (d) a spacing sleeve mounted on said shaft and bearing against said washer and keyed to said shaft;
   (e) a driving sleeve mounted on and keyed to said shaft and having spaced apart annular grooves, one end of said driving sleeve bearing against an adjacent end of said spacing sleeve and the other end exposing the threaded end of said shaft;
   (f) inner races of ball bearings mounted in said driving sleeve annular grooves; outer races of ball bearings carrying said inner races; ball bearing housings supporting said outer races;
   (g) a second washer and nut mounted on the threaded end of said shaft, the nut adapted to be tightened for forcing said second washer against the adjacent end of said drive sleeve for pulling on said shaft for moving said shaft head against said member for forcing said member against said first washer, said first washer in turn forcing the two sleeves toward said second washer;
   (h) whereby said shaft, shaft head, member, first washer, both sleeves, said second washer and nut are rigidly secured together as a unit without in any way creating any binding action on the outer ball bearing races or their supporting bearing housings.

References Cited by the Examiner
UNITED STATES PATENTS

| | | |
|---|---|---|
| 108,801 | 11/1870 | Llewellyn. |
| 1,271,233 | 7/1918 | Sherman _____ 143—155 |
| 2,167,744 | 8/1939 | Cosby et al. _____ 143—155 |

WILLIAM W. DYER, Jr., *Primary Examiner.*

WAYMOND D. BRAY, *Assistant Examiner.*